(12) United States Patent  
Cosman

(10) Patent No.: US 7,257,519 B2  
(45) Date of Patent: Aug. 14, 2007

(54) SYSTEM AND METHOD FOR WEIGHTED CORRECTION OF AN EYEPOINT POSITION

(75) Inventor: Michael A. Cosman, South Jordan, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 796 days.

(21) Appl. No.: 10/211,220

(22) Filed: Aug. 2, 2002

(65) Prior Publication Data

US 2004/0032418 A1   Feb. 19, 2004

(51) Int. Cl.
*G06F 7/60*   (2006.01)
*G06F 17/10*   (2006.01)

(52) U.S. Cl. .......................................... 703/2; 375/316
(58) Field of Classification Search ................ 703/1, 703/2; 375/316
See application file for complete search history.

(56) References Cited

U.S. PATENT DOCUMENTS

| | | | |
|---|---|---|---|
| 5,768,443 A * | 6/1998 | Michael et al. ............. | 382/294 |
| 6,308,144 B1 * | 10/2001 | Bronfeld et al. ............... | 703/2 |
| 6,597,363 B1 * | 7/2003 | Duluk et al. ................. | 345/506 |
| 2001/0047251 A1 * | 11/2001 | Kemp ........................... | 703/1 |

FOREIGN PATENT DOCUMENTS

EP            0319165      * 11/1998

OTHER PUBLICATIONS

Youbing et al. "A Fast Algorithm for Large Scale Terrain Walkthrough" Aug. 2001. CAD/Graphics.*
Lindstrom et al. "Real-Time, Continuous Level of Detail Rendering of Height Fields". Georgia Institute of Technology. Proceedings of ACM SIGGRAPH 96, Aug. 1996, pp. 109-118.*
Duchaineau et al. "ROAMing Terrain: Real-Time Optimally Adapting Meshes". Year of Publication: 1997.*
Rottger et al. "Real-Time Generation of Continuous Levels of Detail for Height Fields". Proc. WSCG'98.*

(Continued)

*Primary Examiner*—Kamini Shah
*Assistant Examiner*—Saif Alhija
(74) *Attorney, Agent, or Firm*—Thorpe North & Western LLP

(57) ABSTRACT

A method is provided for correlating imprecise source data in a local coordinate system to a precise global eyepoint position for a global coordinate system within which the local coordinate system is located. The method includes the step of identifying key correlation points for the local coordinate system which has modeling inaccuracies. Global coordinates are also identified for each of the key correlation points. Another step is computing delta values for each of the key correlation points that represent the difference between key correlation points' local system coordinates and the global coordinate system's coordinate values for the key correlation points. An additional step is modifying the global eyepoint position based on delta values for selected key correlation points as the global eyepoint position moves in relation to the local coordinate system within the global coordinate system.

34 Claims, 2 Drawing Sheets

OTHER PUBLICATIONS

Saha et al. "Web-Based Distributed VLSI Design". IEEE 1997.*
"An Interactive Learning Environment for VLSI Design", Allen et al. IEEE. 1999.*
"Eye Tracking in Advanced Interface Design" Jacob. ACM. 1995. pp. 258-288.*
"Interacting With Eye Movements in Virtual Environments" Tanriverdi et al. CHI 2000. Apr. 2000. pp. 265-272.*
"VR's Frames of Reference . . ." Salzman et al. May 1999. CHI 99. pp. 489-495.*
"The National Simulation Laboratory: The Unifying Tool For Air Traffic Control System Development" Stevens et al. 1991 Winter Simulation Conference. pp. 741-746.*
"Microsoft Flight Simulator" Release Aug. 9, 2000. pp. 1-2.*
"A Fast Algorithm for Large Scale Terrain Walkthrough" Youbing et al. CAD/Graphics 2001. Aug. 22-24.*
"A Virtual Cockpit for a Distributed Interactive Simulation" McCarty et al. Jan. 1994. pp. 49-54.*

* cited by examiner

SYSTEM AND METHOD FOR WEIGHTED CORRECTION OF AN EYEPOINT POSITION

FIELD OF THE INVENTION

The present invention relates generally to computer simulation systems.

BACKGROUND

Computer systems have been used for many years to simulate 3D environments. The complexity of computerized simulators ranges from the simulation of a 3D environment for a game or driving instruction simulator to a high fidelity simulator such as realistic military training simulators. Most of these systems have a number of common elements that are used to make them work. From a high level viewpoint, a simulated environment is created using mathematically modeled structures, and textures or colors are applied over this mathematical framework as a type of skin. Then lighting and shading can be added to the environment. All of this information is viewed by a user using an eyepoint in the environment that samples the appropriate information from the environment.

A simulation system that utilizes a personal computer system may only have a CRT screen for viewing the environment from the eyepoint and a mouse or joystick for input. In contrast, high performance vehicle simulators typically include a cab that is a mock-up of a vehicle, which contains an operator compartment and vehicle instruments and controls. The cab is mounted on a motion base, which provides motion and acceleration cues by moving the cab around. The motion base is coupled to a visual system, which provides the out-the-window imagery and important environmental data for the operator(s) and/or host.

In a high performance simulator, a software system called the host oversees the operation of the simulator. The host monitors the control inputs provided by the operator, and causes the cockpit dials, instruments and displays to reflect the ongoing status of the simulated mission. In addition, the host controls the motion base and related audio systems, and tells the visual system what it needs to know to draw the corresponding out-the-window scene. A real-time system is a software program that is used within the visual system to control the image generator in response to host inputs.

The host tells the real-time system the position of things in the simulated environment (e.g., own aircraft, traffic aircraft, ground traffic, storms, etc.), the status of switchable or selectable things (e.g., runway and environmental lights, runway contamination, etc.), and the setting of global environmental effects like illumination (e.g., day, dusk, night) and visibility (e.g., fog, rain, snow, etc.). The real-time system returns data such as the nature of the surface beneath the tires of the aircraft, and whether collisions have occurred between the aircraft and other traffic or storm cells. This communication is largely asynchronous which means it occurs randomly as needed and is not locked to the ongoing computation of regular image frames.

The real-time system gets the required scene data from disk storage and loads it into the appropriate parts of the image generator in an on-going background process called paging. It also sends commands to the image generator to implement lighting, environmental, and other special effects called for by the host. It determines the proper level-of-detail (LOD) for scene elements and prepares them for rendering after eliminating those elements that will not appear in any window. This process includes the translations and rotations needed to get scene elements into their proper position within the scene. The real-time system also manages the rendering portion of the image generator in a synchronous, lock-step fashion that guarantees a steady stream of video to the displays.

A high fidelity simulation system, such as the one described, contains many different types of scene elements such as terrain, areal features such as tree canopies, linear features (roads, hedgerows, fences), and point features (trees, power poles, houses, light points).

Other models are also included in the system such as moving models of airplanes, cars, and helicopters, or environmental models such as clouds, sky, storms, or lightning flashes, etc.

SUMMARY OF THE INVENTION

A method is provided for correlating imprecise source data in a local coordinate system to a precise global eyepoint position for a global coordinate system within which the local coordinate system is located. The method includes the step of identifying key correlation points for the local coordinate system which has modeling inaccuracies. Global coordinates are also identified for each of the key correlation points. Another step is computing delta values for each of the key correlation points that represent the difference between key correlation points' local system coordinates and the global coordinate system's coordinate values for the key correlation points. An additional step is modifying the global eyepoint position based on delta values for selected key correlation points as the global eyepoint position moves in relation to the local coordinate system and the global coordinate system.

Additional features and advantages of the invention will be apparent from the detailed description which follows, taken in conjunction with the accompanying drawings, which together illustrate, by way of example, features of the invention.

DETAILED DESCRIPTION

Figure 1:
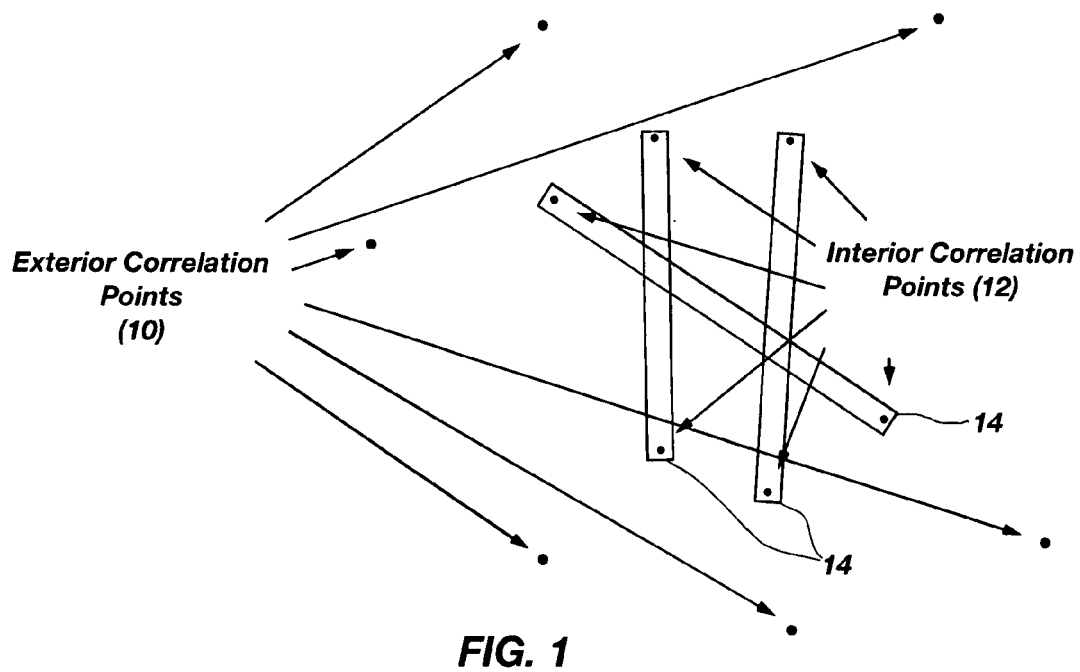
FIG. 1 illustrates a top view of an airport inset with correlation points in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is a system and method for correlating imprecise source data in a local coordinate system to a precise global eyepoint position for a global coordinate system within which the local coordinate system is located.

This correlation takes place for a computer simulation system where the local coordinate system has been included in the global coordinate system. The system and method identifies key correlation points for the local coordinate system and also identifies global coordinates for each of the key correlation points. Once these points have been found then the system computes delta values for each of the key correlation points that represent the difference between key correlation points' local system coordinates and the global coordinate system's coordinates values for the key correlation points.

The global eyepoint position is then modified based on delta values for key correlation points as the global eyepoint position moves in relation to the local coordinate system and the global coordinate system. The present invention can also create a polygon mesh to connect the key correlation points and/or exterior correlation points to form one or more polygons having vertices. These polygons can be used to determine which key correlation points and exterior correlation points may be used to modify the global eyepoint position, and the polygons can be used to help calculate the weighting of the delta values to be added to the global eyepoint position. This invention can be used in precise battle vehicle simulations (e.g., tanks), flight simulations, travel simulations and other high fidelity computer simulations.

Now that the invention has been described generally, a detailed description of one embodiment of the invention as it is applied to a high performance simulator will be described. One element of a simulation system according to an embodiment of the present invention is the terrain. When the system of the present invention models the terrain, it can contain heterogeneous data covering a wide range of area around the globe. For example, the terrain may cover the area of −80 to +80 degrees latitude. Resolution can be nominally 1 km, but it may be lower over the oceans and large flat areas, and higher in mountainous regions significant to the simulation. The planetary poles can also be represented in this terrain model at a lower resolution if desired.

Providing data in this manner creates a whole-earth model or global coordinate system for the simulation. This whole-earth model or global model forms a type of substrate or base model that all the models are inserted into (e.g., airport models, military bases, etc.), and which serves as an organizing layer for all the other features that lie on the terrain. This type of model assists in providing a whole-earth, geodetic based model. The model can also be decorated with textured areas, textured theme cells (or themels) and, where appropriate, linear, areal, and point features.

As mentioned, airports are another element used in an embodiment of the invention that is for vehicle simulations and the airports are often 50×50 or 100×100 kilometers square. The airports generally fall into two main categories: those that use detailed texture and those that do not. The airports that do not use detailed texture can use generalized feature texture for the surrounding airport terrain texture. Airport models generally use a fixed LOD of terrain throughout the model. Generic ground texture then exists outside of the airport region. Insets of higher resolution detailed image data and/or photo texture may be added in the vicinity of airports.

Airport models will generally include all the runways, terminal buildings, and close proximity features that exist within the airport fenced boundary. They are typically on the order of 5 kilometers in extent, although not necessarily square. The region surrounding the inner airport model is known as the airport perimeter. An airport model can also include a collection of shared models such as airplanes, baggage carts, cars, ships, etc., that are statically or dynamically placed throughout an airport model when the model's database is loaded. These models provide airport "clutter". Additional shared models include storms, clouds, lightning, and other weather effect models, which are shared between airport databases.

Existing airport models or a local coordinate system can be incorporated into a whole-earth model in one of several ways. If the goal is a simple conversion of an existing airport, then the modeler can just include the existing perimeter data contained in a converted airport model that will be inserted in the whole-earth model. This can in effect extend the airport model to include the perimeter region.

If the goal is to improve the terrain fidelity in the airport perimeter region, and elevation data is available for that region, then the perimeter area would be built as a high-resolution terrain inset. It can be textured with either photo-specific texture if available, or from detailed, themed textures. This region can also include linear, areal, and point features. The airport perimeter module of the real-time system manages the perimeter regions by determining which airport perimeter(s) need to be loaded and initiating the loading of any terrain, texture insets and airport features.

Civil flight, military vehicle, and similar high fidelity training require very precise correlation of the simulated vehicle's position with navigation aids that relate to the real world. Runway thresholds need to be within a fraction of a foot, laterally and vertically, of their real-world counterparts. The modeling process and the source materials used to develop airport models are all sources of error, and many older legacy models cannot provide proper correlation without some type of runtime correction of the eye position, typically based on the selection of the active runway.

Unfortunately, host programs and airport models have been developed in several different world geodetic systems. In many cases, the airport models themselves have distortions and errors that prevent the simultaneous registration or alignment of all the runways and approach points in a whole-earth system. Different hosts and different simulators use different critical positions within the same airport model or local coordinate system. All these discrepancies are resolved for each combination of host and airport by a manual process that includes positioning, measuring, correcting and editing data used by the host to control near-airport operations. One consequence of this is that the geodetic space the host operates in is no longer static. In other words, the airport model is actually moved to get each correlation point properly positioned when it is most critical.

As mentioned, the airport model may include surrounding terrain out to 100 kilometers or more. The subtle shift of this model relative to absolute latitude-longitude space is hidden in some simulator systems by the fact that there is nothing fixed to the absolute space with which the shifted airport can be compared. When airport areas of interest are extracted from these historic models, and are combined with a whole-earth absolute latitude-longitude (lat-long) space or global coordinate system, boundary condition matching becomes more difficult or even impossible. For example, if a road in the airport inset is to continue uninterrupted into the world model, the shifting of the airport model to accommodate different runways tends to cause mismatches at the boundary.

This embodiment of the present invention defines a single registration of each airport model to the whole-earth lat-long space so that boundary points can be consistent and well behaved. This also allows the system to apply global texture from the world model (extended to higher LOD in the inset areas) onto the airport inset itself, further aiding the visual integration of the inset and world model. In contrast, systems that achieve correlation by actually moving the airport (as opposed to modifying the host eye position) cannot generally have texture that crosses continuously from the background earth onto the airport. This is because the airport is not in a fixed location and it is problematic to try to place texture when the airport is being moved.

This implies that the system has a single world model or global coordinate system, and a single registration of every possible airport to that world model. The term world model or global coordinate system does not imply that the entire planet earth must be modeled but that a large portion of the world is modeled. This process and method of this invention works the same whether the larger global coordinate system and inset local coordinate system is in lat/long or X/Y coordinates. Although one embodiment of the present system uses geodetic coordinates, the use of geodetic coordinates is not essential for the use of this invention. Further, if a customer or system user purchases additional airport models, the system of the present invention can correlate these models with the customers existing host, without having to modify the customer software, and without a tedious manual calibration/correlation step.

The problem is how to subtly and continuously modify the relationship of host position or eyepoint position and model position so that the host can move between correlation points and always be at the correct location when the host arrives at the correlation point. Currently the host makes these adjustments, and every host does it differently for every airport. Providing a uniform system and method for adjustment in the real time system allows a single world with multiple inserted airport models to be adjusted to the needs of every host.

Weighted Correction

This system and method provides a continuous, linearly weighted or barycentrically controlled correction that allows multiple positions on an airport to be simultaneously correlated. This correction is performed automatically in the real time system and without host intervention. This allows old airports to be merged into new terrain and to be properly correlated.

For every airport, there are a small number of positions for which the host expects and the eyepoint benefits from exact correlation. These typically include runway thresholds, gate positions and similar important features. If the airport model itself is acceptably accurate or at least the model's distortions are linearly distributed, then from any one correlation point, the rest of the world should look acceptable.

FIG. 1 illustrates a top view of an airport with three runways 14 that are inset with correlation points into the whole-earth space. Initially, a whole-earth model is populated with all the selected airports, where each airport is located at the single position and orientation that is the best overall fit for the geodetic system. Next, for each airport (or complex of airports, if they are close together) the modeling system includes identified key correlation points, including interior correction points 12, that are host-independent. These points can include positions marked on navigation charts and aids for which there is international agreement, and positions that can be correlated visually, such as ends of runways, critical intersections, etc.

Figure 2:
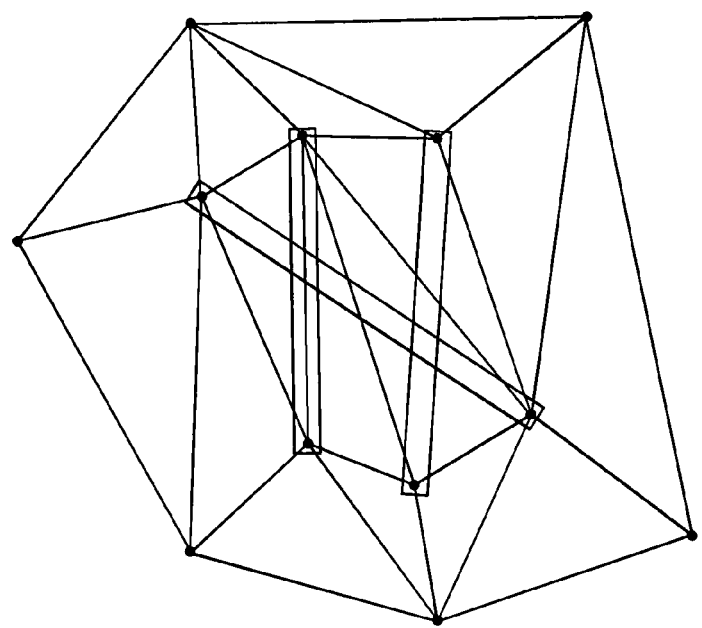
FIG. 2 depicts the correlation points of FIG. 1 connected together in a contiguous triangulated mesh.

The system also identifies correlation points at some distance from the airport or exterior correlation points 10 (FIG. 1), and connects all these points together into a contiguous polygonal mesh that entirely covers the airport and its local surrounding area. This contiguous polygonal mesh is illustrated in FIG. 2 as a triangular mesh, which is one type of polygonal mesh that may be used. Typically, the distant surrounder points represent the boundary beyond which no correction is needed. A mesh that is not triangular can also be used. For example, the mesh may be a mesh of squares, pentagons, hexagons, etc., or other polygons. Alternatively, the mesh can be a mix of 3, 4, 5 or up to N sided polygons that are not necessarily regular in shape, orientation or size.

When a user purchases an airport model, the user determines the host coordinates for each of these correlation points, and makes this information available to the real-time system. One way to determine the host coordinates for correlation points is to edit a small airport-specific site file that is used at initialization. For example, there may be fewer than a dozen correlation points for a typical airport, but a greater or lesser number of correlation points can be used as needed. Note that the user does not need to know about the underlying polygonal connectivity of these points.

Figure 3:
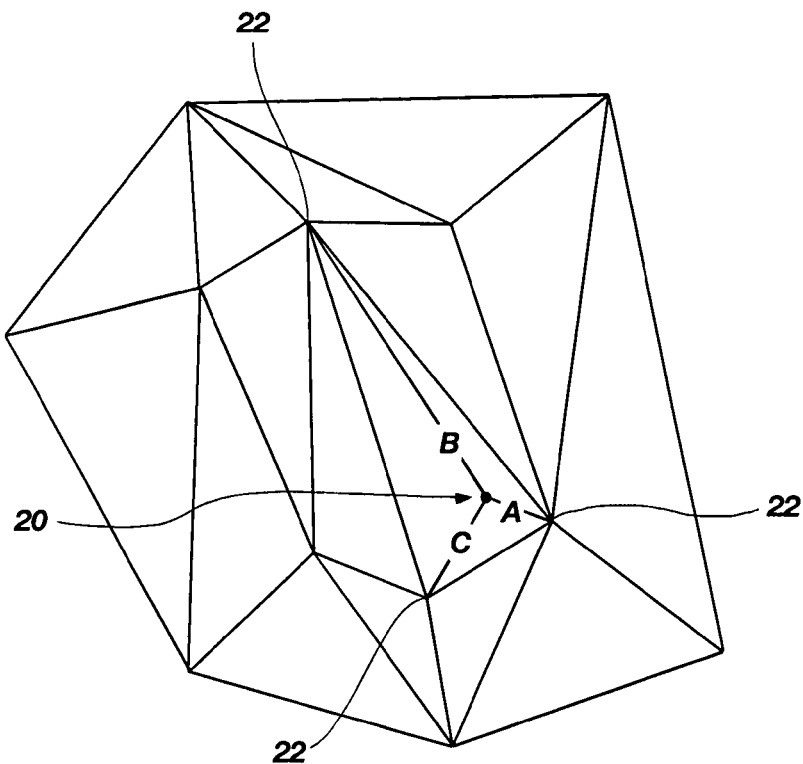
FIG. 3 illustrates an eyepoint within the bolded triangle.

At startup time, the real-time system uses this information to compute a set of delta values for each correlation point between the host values and the real time system's internal coordinate values. Specifically, in this illustrative embodiment the real time system's internal coordinate values are represented as lat-long and heading values, but other coordinate systems can be used (e.g., polar coordinates or X-Y coordinates). The lat-long delta values are further converted to equivalent X-Y delta values, given the latitude of the airport. As illustrated in FIG. 3, when the aircraft or global eyepoint position 20 approaches a particular airport during the simulation, its position within the triangular mesh is determined. A barycentric weighting of the correction delta values at the surrounding correlation points 22 is used to compute an offset which is applied to the global eyepoint position or host position data. As the global eyepoint position or aircraft moves through the triangular mesh, its position is continuously distorted so that when it crosses over a correlation point, there is exact agreement between the host or global eyepoint position, and the real time system and visual image generator. In other words, the global eyepoint position in the real time system will be advanced or impeded based on the delta values, and this will be transparent to the host or end user. Use of barycentrics ensures that there is a continuous, smooth correction without discontinuities or abrupt changes. Although the present embodiment describes modifying the eyepoint in an X-Y plane, the eyepoint can also be modified or distorted in all six degrees of freedom, including X, Y, and Z and heading, pitch and roll.

When a mesh is used that is not triangular then bi-linear interpolation can be used or some other interpolation method can be devised to calculate the corrected viewpoint. For example, the mesh may be a mesh of polygons such as squares, pentagons, hexagons or arranged polygons.

If necessary, the mesh can be extended hierarchically to connect all the airports and completely cover the entire earth. This could be used to correct for the host using a different world geodetic system (WGS) model, for example. If the host geodetic system generally agrees with the system of the present invention, then the global mesh is not needed, and the system sets the correlation delta values to zero for the perimeter correlation points around each airport.

In most cases, positions intermediate to the correlation points will be adequately precise, since they are not very far from a correlation point, and the rate-of-change of the correction delta values can generally be assumed to be small. Particular users can do visual positioning at key points (such as specific gates) and determine their host coordinates, as required. This visual positioning by a user can also be used to better calibrate the underlying model described here.

Computations

One embodiment of the underlying arithmetic for a triangular mesh will now be described. Calculations for meshes that are not triangular would require modifications over what is described here. Generally speaking, the goals for the interpolation/correction process are that the corrected positions agree at the correlation points, that the corrected positions be repeatable at locations that are not correlation points, and that the corrections change continuously.

First, the eyepoint lat-long position is subtracted from the global airport lat-long origin to get a lat-long delta relative to the global airport origin. This calculated delta is then converted into X-Y coordinates based on the latitude of the airport, which forms an airport-relative eye position. The airport correlation points are also stored in X-Y coordinates relative to the airport origin, so all the values are in a common Cartesian coordinate system. The global airport lat-long origin is usually defined when the builder of the airport model selects a point on the airport as a local origin, and specifies the lat-long position of this point.

For selected triangles in the mesh, 2D vectors are formed from the eyepoint X-Y to each correlation vertex. These vectors are illustrated as A, B, and C in FIG. 3. Each 2D cross product can be computed with two multiplies and a subtract, and equates to twice the area of the sub-triangle formed by the eye and the triangle edge. The sign of the result says whether the global eyepoint position is inside or outside the triangle, and can be used to find the surrounding (and hence controlling) triangle for the eyepoint. The size of the result can also be used to remember the most likely triangle(s) to test next frame, reducing overall workload.

Once the triangle containing the eyepoint is found, the three associated area measures are normalized by dividing them by their sum, creating three barycentic weights. The instantaneous correction factors are computed by multiplying each barycentric weight by its associated correction delta values, and summing the delta values. The correction delta values for X, Y, Z and heading are then added to the converted host X, Y, Z, and heading values to get the values that apply in the global geodetic system. Other higher order method of corrections such as quadratic corrections that preserve first order continuity at boundary of triangles might also be used.

Figure 4:
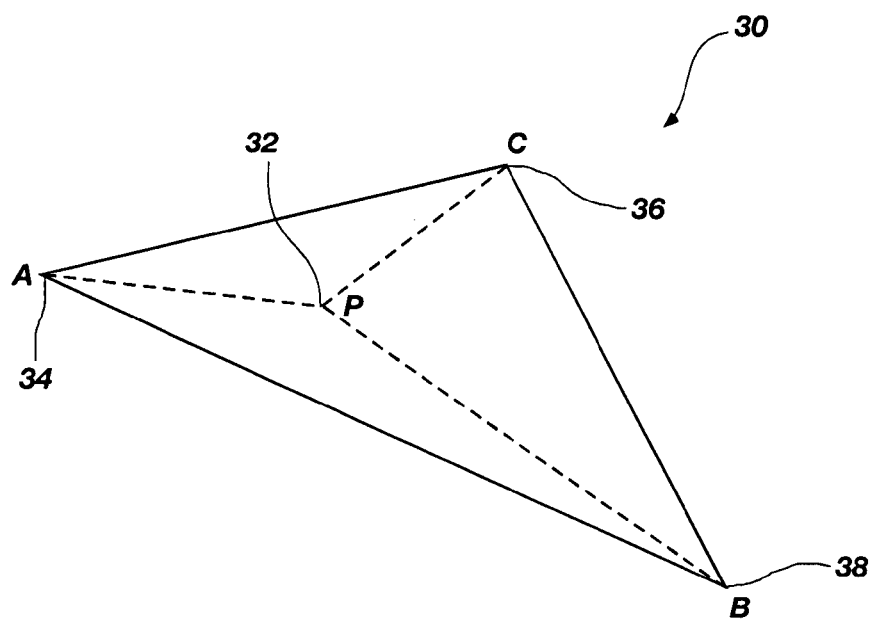
FIG. 4 depicts a triangle that can be used in a barycentric calculation.

FIG. 4 illustrates a method for calculating a barycentric correction that can be used with a triangular mesh embodiment of the invention. Point P 32 is interior to triangle ABC 30. The three barycentric weights that characterize the behavior of a viewpoint at point P relative to vertices A, B and C, are the areas of the three sub-triangles defined by P and the triangle vertices. The weight associated with triangle vertex C 36 is the area of triangle PAB; the weight associated with vertex A 34 is the area of triangle PBC, and the weight associated with vertex B 38 is the area of triangle PCA. The normalizing factor is the sum of these three weights.

The area of a triangle is computed using the vector cross product. Recall that the cross product is a new vector, perpendicular to the plane of the original two vectors, whose length is equivalent to the area of the parallelogram defined by the original vectors. If the two original vectors lie in the XY plane, then the resultant vector will have only a Z component. Thus the area of triangle PAB is edge PA cross edge PB, divided by 2. If PA and PB lie in the XY plane, then only the Z component of the resultant vector need be computed:

$$Area = [PAx*PBy - PBx*PAy]/2$$

where PAx is the X component of vector PA, etc. Once the three areas are determined, the value of some parameter at position P (i.e. the global eyepoint position) is just the values of that parameter at vertices A, B and C, multiplied by their associated weights (areas), and divided by the sum of the weights (areas). For example, the value of parameter Q at position P is $$Qp = \frac{Qa*(PBx*PCy - PCx*PBy) + Qb*(PCx*PAy - PAx*PCy) + Qc*(PAx*PBy - PBx*PAy)}{PBx*PCy - PCx*PBy + PCx*PAy - PAx*PCy + PAx*PBy - PBx*PAy}$$

The calculation can skip the divide by 2, since it occurs in both the numerator and denominator.

The above techniques help define a single best-fit registration for every airport in the system's whole-earth geodetic system. This allows the system to perform a compile-time blend and merge of airports, specific and whole-earth texture, and to provide geometric continuity for things like roads that continue from the airport inset onto the whole-earth model.

In some cases, airports may be modeled with enough error that it is desirable to perform a compile-time correction of the airport's geometry. The techniques described above can be used to compute corrections for individual polygon vertex positions throughout the airport model. This process can be completely automated when the correlation points are provided. In this case, corrections to headings are absorbed by modifications to the X, Y, and Z values. Generic airports can still be positioned and oriented as dynamic models, using cut-and-fill techniques to merge them into the terrain.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method for correlating imprecise source data in a local coordinate system to a precise global eyepoint position for a global coordinate system within which the local coordinate system is located within a computer simulated environment, comprising the steps of:

identifying key correlation points for the local coordinate system, which has modeling inaccuracies;

identifying global coordinates for each of the key correlation points;

computing delta values for each of the key correlation points that represent the difference between key correlation points' local system coordinates and the global coordinate system's coordinate values for the key correlation points;

and modifying the global eyepoint position based on delta values for selected key correlation points as the global eyepoint position moves in relation to the local coordinate system and the global coordinate system;

displaying an image of the computer simulated environment to a user based on the modified global eyepoint position.

2. A method as in claim 1, further comprising the step of modifying the global eyepoint position based on weighted delta values for key correlation points.

3. A method as in claim 1, further comprising the step of adding a portion of the computed delta values to the eyepoint position based on the eyepoint's comparative distance from key correlation points.

4. A method for correcting a global eyepoint within a local coordinate system that has modeling variations as compared to a global coordinate system into which the local coordinate system has been inserted for a computer simulated environment, comprising the steps of:

identifying key correlation points for the local coordinate system which has modeling inaccuracies;

identifying global eyepoint coordinates for each of the key correlation points;

creating a polygon mesh to connect at least the key correlation points to form at least one polygon having vertices;

computing delta values for each of the polygon vertices that represent the difference between the global eyepoint coordinates and the larger scale terrain's coordinate values in relation to the key correlation points;

and modifying the position of the global eyepoint based on weighted delta values for polygon vertices as the global eyepoint moves in relation to the triangles;

displaying an image of the computer simulated environment to a user based on the modified global eyepoint position.

5. A method as in claim 4, further comprising the step of identifying exterior correlation points at a distance from the perimeter of the local coordinate system.

6. A method as in claim 5, further comprising the step of creating a polygon mesh to connect the key correlation points and exterior correlation points to form polygons having vertices.

7. A method as in claim 6, wherein the step of creating a polygon mesh further comprises the step of creating a triangular mesh to connect the key correlation points and exterior correlation points to form triangles having triangle vertices.

8. A method for correcting a host position within inset terrains that have modeling variations as compared to a larger scale terrain for a computer simulated environment, comprising the steps of:

identifying key correlation points for each inset terrain and host coordinates for each of the key correlation points, where the key correlation points are host independent;

selecting exterior correlation points at a distance from the perimeter of the inset terrain;

creating a polygon mesh to connect the key correlation points and exterior correlation points to form polygons having vertices;

computing delta values for each polygon vertex that represent the difference between the host coordinates and the larger scale terrain's coordinate values in relation to the key correlation points;

and modifying the position of a host eyepoint based on weighted delta values for polygon vertices as the host eyepoint passes through the polygons;

displaying an image of the computer simulated environment to a user based on the modified host eyepoint position.

9. A method as in claim 8, wherein the step of creating a polygon mesh further comprises the step of creating a triangular mesh to connect the key correlation points and exterior correlation points to form triangles having triangle vertices.

10. A method as in claim 8, further comprising the step of identifying key correlation points for inset terrains that represent airports.

11. A method as in claim 9, further comprising the step of identifying key correlation points such as correlation points selected from the group of correlation points consisting of ends of runways, critical intersections and road boundaries.

12. A method as in claim 8, wherein the step of computing delta values further comprises converting resultant delta values into equivalent X, Y delta values based on the latitude of the airport.

13. A method as in claim 8, wherein the step of modifying the position of the host eyepoint further comprises the step of modifying the position of the host eyepoint by using linear weightings to modify the host eyepoint.

14. A method as in claim 13, further comprising the step of modifying the position of the host eyepoint linearly so that there is there is substantial agreement between a host coordinate and latitude-longitude and heading values when the key correlation points are crossed.

15. A method as in claim 8, wherein the step of modifying the position of the host eyepoint further comprises the step of modifying the position of the host eyepoint by using barycentric weightings.

16. A method as in claim 8, wherein the step of modifying the position of the host eyepoint further comprises the step of modifying the position of the host eyepoint by using higher order weightings to modify the host eyepoint while preserving first order continuity at triangle boundaries.

17. A method as in claim 16, wherein the step of modifying the position of the host eyepoint further comprises the step of modifying the position of the host eyepoint by applying quadratic corrections.

18. A method for correcting a host position within inset airports that include modeling discrepancies as compared to a global model for a computer simulated environment, comprising the steps of:

identifying key correlation points for each airport that are host independent and host coordinates for each of the key correlation points;

selecting exterior correlation points at a distance from the perimeter of the inset terrain;

creating a triangular mesh to connect the key correlation points and exterior correlation points to form triangles having triangle vertices;

computing delta values for each triangle vertex, that represent the difference between the host coordinates and latitude-longitude and heading values in the global model;

and interpolating the position of a host eyepoint linearly between key correlation points based on the delta values for triangle vertices as the host eyepoint passes from one triangle's boundaries to another;

displaying an image of the computer simulated environment to a user based on the modified host eyepoint position.

19. A method as in claim 18, wherein the step of computing delta values further comprises converting resultant lat-long delta values into equivalent X, Y delta values based on the latitude of the airport.

20. A method as in claim 18, further comprising the step of interpolating the position of the host eyepoint linearly so that there is there is substantial agreement between a host coordinate and latitude-longitude and heading values when the key correlation points are crossed.

21. A method as in claim 18, further comprising the step of identifying key correlation points such as correlation points selected from the group of correlation points consisting of ends of runways, critical intersections and road boundaries.

22. A method as in claim 18, wherein the step of interpolating the position of the host eyepoint further comprises the step of interpolating the position of the host eyepoint using barycentric weightings to modify the host eyepoint.

23. A method for correcting a host position within inset airports that include modeling discrepancies as compared to a global model for a computer simulated environment, comprising the steps of:

identifying key correlation points for each inset terrain that are host independent;

identifying host coordinates for each of these correlation points;

selecting exterior correlation points at a distance from the center of the inset terrain;

creating a triangular mesh to connect the key correlation points and exterior correlation points to form triangles having triangle vertices;

computing delta values for each triangle vertex that represent the difference between the host coordinates and internal latitude-longitude and heading values;

and interpolating the position of a host eyepoint based on the weighted delta values for triangle vertices as the host eyepoint passes from one triangle's boundaries to another;

displaying an image of the computer simulated environment to a user based on the modified host eyepoint position.

24. A method as in claim 23, wherein the step of interpolating the position of the host eyepoint further comprises the step of interpolating the position of the host eyepoint by using barycentric weightings to modify the host eyepoint.

25. A method as in claim 23, further comprising the step of subtracting an eyepoint lat-long position from a global airport lat-long origin to form delta relative to the global airport origin.

26. A method as in claim 25, further comprising the step of converting the delta relative to the global airport origin into X-Y coordinates based on the latitude of the airport in the global model, which forms an airport-relative eyepoint.

27. A method as in claim 23, further comprising the step of creating 2D vectors from the eyepoint to each triangle vertex.

28. A method as in claim 27, further comprising the steps of:

computing a 2D cross product of each vector; and testing the 2D cross product to determine whether the eyepoint is within a given triangle.

29. A method as in claim 23, further comprising the step of computing a 2D cross product of each vector to provide a value that represents twice the area of the sub-triangle formed by the eyepoint and the triangle edge.

30. A method as in claim 29, further comprising the step of computing the 2D cross product for each triangle vertex in the triangle within which the eyepoint is located.

31. A method as in claim 30, further comprising the step of dividing the 2D cross product of each vector by the sum of the three 2D cross products to create three barycentric weights.

32. A method as in claim 31, further comprising the step of computing the instantaneous correction factors for the eyepoint by multiplying each barycentric weight by its associated correction delta values and then summing the delta values.

33. A method as in claim 32, further comprising the step of adding the correction delta values for the X, Y, Z and heading to the host eyepoint.

34. A method as in claim 33, further comprising the step of applying a corrected host eyepoint in the global model.

* * * * *